(12) United States Patent
Faulk

(10) Patent No.: US 7,185,612 B2
(45) Date of Patent: Mar. 6, 2007

(54) ANIMAL WOUND SHIELD

(76) Inventor: Kevin Faulk, 3530 Forest Blvd., Jacksonville, FL (US) 32246

(*) Notice: Subject to any disclaimer, the term of this patent is extended or adjusted under 35 U.S.C. 154(b) by 0 days.

(21) Appl. No.: 11/103,628

(22) Filed: Apr. 12, 2005

(65) Prior Publication Data

US 2006/0225670 A1    Oct. 12, 2006

(51) Int. Cl.
*A01K 13/00* (2006.01)
*A61D 9/00* (2006.01)
*A61F 5/00* (2006.01)
*B68C 5/00* (2006.01)
*A01L 7/02* (2006.01)

(52) U.S. Cl. .................. 119/850; 119/856; 119/712; 119/726; 119/814; 119/815; 36/111; 602/16; 602/28; 602/23; 128/882; 128/888; 54/82; 168/18; 168/1

(58) Field of Classification Search .............. 36/89, 36/90, 111; 602/16, 24–26, 28, 29, 5, 27, 602/23; 128/846, 869, 882, 888, 889; 119/850, 119/856, 712, 726, 725, 810, 814, 816–818; D30/146–150, 144, 199; 54/82; 168/7, 168/18, 1–3
See application file for complete search history.

(56) References Cited

U.S. PATENT DOCUMENTS

| | | | |
|---|---|---|---|
| 416,041 A * | 11/1889 | Schild ............................ 168/2 |
| 901,592 A * | 10/1908 | Clegg ............................ 54/82 |
| 2,188,787 A | 1/1940 | Keener | |
| 3,439,670 A * | 4/1969 | Schuerch .................... 602/26 |
| 3,742,679 A * | 7/1973 | Jordan ........................ 54/79.1 |
| 3,791,383 A | 2/1974 | Friedman | |
| 4,510,888 A | 4/1985 | DeAngelis et al. | |
| 5,495,828 A | 3/1996 | Solomon et al. | |
| 5,634,437 A * | 6/1997 | Petersen ..................... 119/714 |
| D382,378 S | 8/1997 | Stark | |
| 6,186,097 B1 | 2/2001 | Brockmann et al. | |
| 6,305,713 B1 * | 10/2001 | Pywell et al. ............ 280/801.1 |
| 6,470,832 B1 | 10/2002 | Peacock | |
| 6,526,920 B1 * | 3/2003 | Griffin ....................... 119/850 |
| 6,546,704 B1 * | 4/2003 | Fisher .......................... 54/82 |
| 2001/0056251 A1 * | 12/2001 | Peters ......................... 602/27 |
| 2004/0199092 A1 | 10/2004 | Biewemd et al. | |
| 2004/0255955 A1 * | 12/2004 | Daly .......................... 128/869 |
| 2005/0066632 A1 * | 3/2005 | Ford et al. .................... 54/82 |
| 2005/0096576 A1 * | 5/2005 | Castro ......................... 602/27 |

FOREIGN PATENT DOCUMENTS

EP          521288 A1 *  1/1993
WO        WO 95/00011  *  1/1995

* cited by examiner

*Primary Examiner*—Andrea M. Valenti
(74) *Attorney, Agent, or Firm*—Richard C. Litman

(57) ABSTRACT

The animal wound shield is a protective casing having a shank portion and an appendage cover that can be disposed around a limb and an attached appendage of the animal. The appendage cover is articulated to a lower end of the shank. Thus, the appendage cover is pivotally connected to the shank and moves with the movement of the appendage. The shank may have more than one section, or an upper and lower portion, to extend further up on the limb, and yet still accommodate for joints. The shield is designed for use around an injured limb to cover a bandaged area and prevent further damage to the wounded site. Vent openings are defined in the shank and the appendage cover to permit air circulation. Fasteners may be used at a top end of the shank to hold the shank on the limb.

12 Claims, 2 Drawing Sheets

ANIMAL WOUND SHIELD

BACKGROUND OF THE INVENTION

1. Field of the Invention

The present invention relates to a protective casing for an animal. More particularly, the animal wound shield is a protective limb casing that encircles a wounded and bandaged limb to prevent the wound or bandage from being picked at by the animal and to protect the area from further damage from external elements.

2. Description of the Related Art

An injured animal can be its own enemy in preventing a speedy recovery from a wound. In order to prevent injured animals from removing bandages protecting a wound, an owner currently has the option of spraying a bitter solution over the bandage or using a cone collar. Cone collars are commonly used in veterinary medicine. The cone collar is disposed about the animal's neck to prevent injured animals from tampering with bandages and aggravating damage to an injured area. The cone collar, however, is cumbersome and prevents the animal from carrying out its normal activities, such as relaxing, sleeping or eating. The cone collar not only restricts the animal's movement, but also obstructs the animal's peripheral vision. A device is desired that will prevent animals from tampering with bandages and tearing out stitches and wound dressings on injured limbs. Thus, an animal wound shield solving the aforementioned problems is desired.

SUMMARY OF THE INVENTION

The animal wound shield is a protective casing having a shank portion and an appendage cover that can be disposed around a limb and an attached appendage of the animal. Fasteners, such as pivot pin or a nut and bolt, articulate a lower end of the shank with an upper end of the appendage cover. The fasteners, therefore, secure the appendage cover to the shank and permit the appendage cover to pivot as the appendage is flexed during normal movement. The animal wound shield may include more than one shank piece, or upper and lower portions, in order to extend the shield further up on the animal's limb.

The shield is designed for use around an injured limb to cover a bandaged area and prevent more damage to the wounded site. The shield is made in a variety of sizes to accommodate limbs of various sizes on any size animal.

Vent openings are defined in the shank and the appendage cover to permit air to pass through to the limb and appendage.

Fasteners are used at a top end of the shank to hold the shank in position on the limb. Such fasteners may include adhesives or a hook patch of hook and loop fastening material. When an adhesive fastener is used, the top end of the shank is taped to the bandaged limb. Alternatively, when the fastener is a patch of hook material, the patch lines an inner surface of the top end of the shank and the user simply slides the shank over the limb and permits the hook material to engage the gauze bandages.

In use, the user selects an appropriate size shield for a particular animal limb. The user then slides the shank over a bandaged limb and either secures the shank to the limb using adhesive or fastens the shank to the limb using the hook material mating with the bandage. The appendage cover is pre-assembled to the shank and is arranged to cover the appendage and articulate up or down as dictated by the movement of the appendage.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
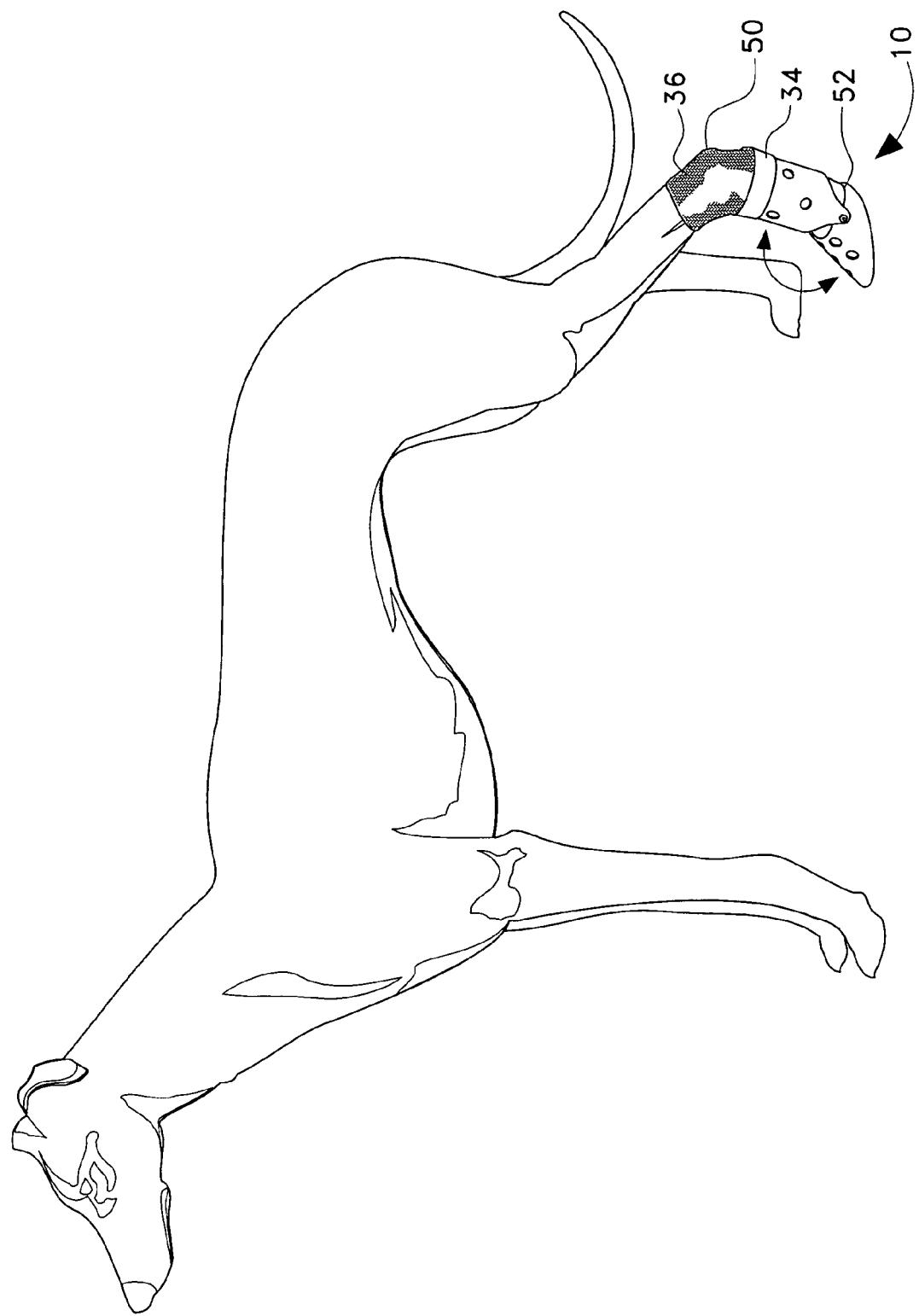
FIG. 1 is an environmental, perspective view of an animal wound shield according to the present invention.
Figure 2:
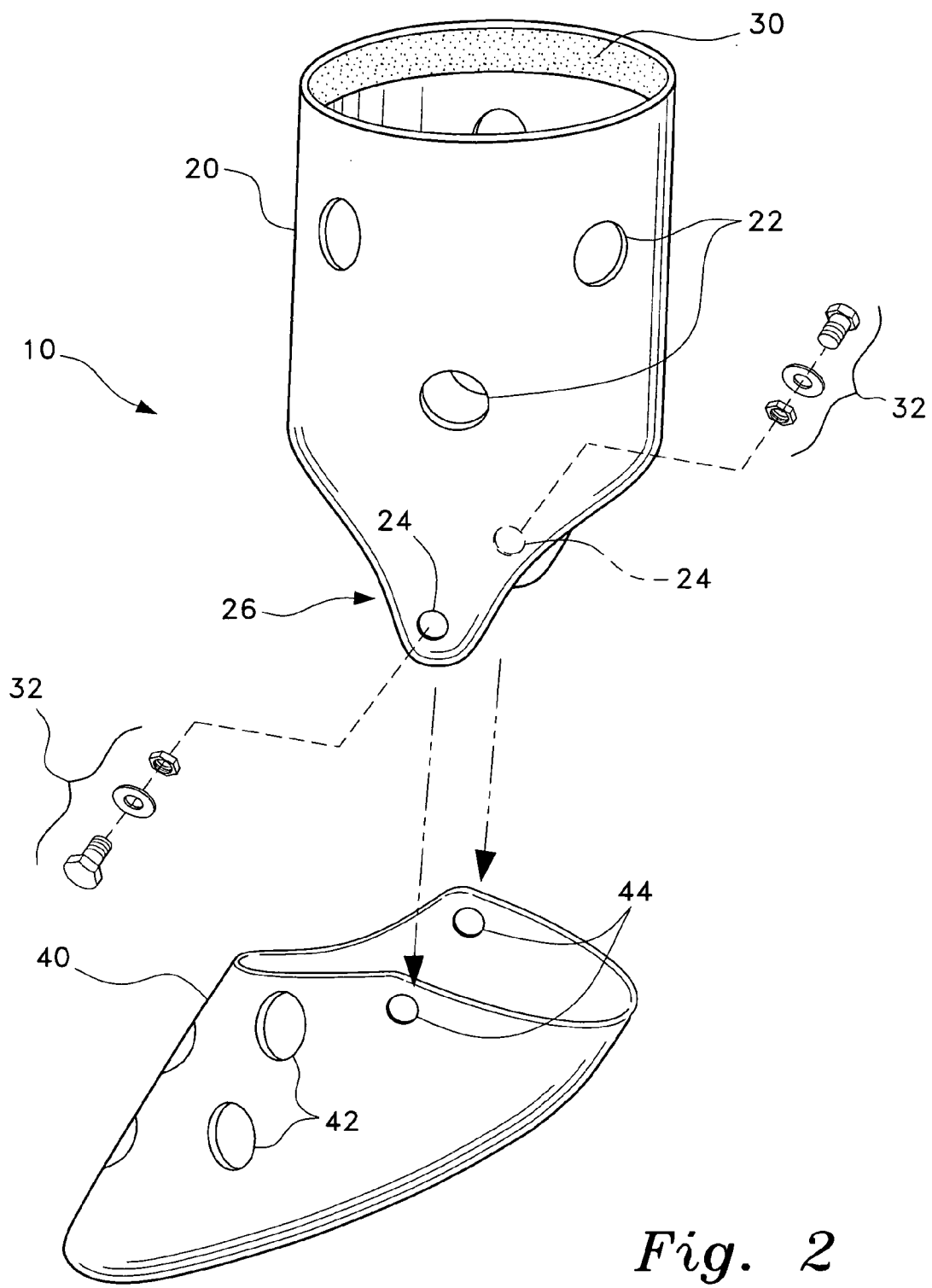
FIG. 2 is a side view of the animal wound shield according to the present invention.

The present invention is an animal wound shield, designated generally as 10 in the drawings. As shown in FIGS. 1 and 2, the animal wound shield 10 is a protective casing for a limb and an attached appendage of an animal. The animal wound shield 10 has a shank portion 20 and an appendage cover 40 connected to the shank 20. The appendage cover 40 is disposed over the animal's appendage and articulates up or down as dictated by the movement of the appendage.

The shield 10 is designed to cover the limb between the animal's joints 50 and 52, as well as the paw or lower appendage, and thereby not hamper the animal's movement. The shield 10 is shown on a hind leg of an animal where joint 50 is the junction between the femur and the tibia/fibula, and joint 52 is the junction between the tibia/fibula and the tarsus. The shield 10 is not limited for use on the hind legs and may work equally well on the forelegs or the arms of a biped, in which case the shield 10 extends between the joint between the humerus and radius/ulna and the joint between the radius/ulna, and also covers the hand.

The shank 20 is a generally cylindrical body having a top end and a bottom end. Vent openings 22 that are designed to permit air to pass through to the damaged limb are dispersed across the body of the shank 20. The top end of the shank 20 is below joint 50. The top end can use fasteners 30, 34 to hold the shank 20 to the bandaged limb of the animal. Fastener 34 is an adhesive material, e.g., adhesive tape, that is disposed about an outer surface of a top end of the shank 20. Fastener 30 is a patch of hook and loop fastening material, and particularly a patch or strip of hook material, which is disposed about or lines an inner surface of a top end of the shank 20. The fasteners 30, 34 may be used in conjunction with each other or separately.

When the fastener is adhesive fastener 34, the top end of the shank 20 is taped to the bandaged limb. Alternatively, when the fastener comprises a patch of hook material 30, the user simply slides the shank 20 over the limb and ensures that the hook material 30 engages the gauze bandage. In some embodiments, only the adhesive fastener 34 is used to hold the shank 20 to the limb. The hook material 30 requires a surface to grasp, so that if the wound is not bandaged, or the bandage is not made from material that mates with the hook material 30, only the adhesive fastener 34 is used.

The bottom end of shank 20 extends to a region above the joint 52 that connects the appendage to the lower limb, between the tibia/fibula and the tarsus (the paw or foot of the animal). The bottom end of shank 20 has two lugs 26, which extend from the main body of the shank 20. The lugs 26 project from the shank 20 and permit articulated connection of the shank 20 to the appendage cover 40. By extending away from the body of the shank 20, the lugs 26 create space between the shank 20 and the appendage cover 40. This space permits the appendage cover 40 to pivot with the movement of the animal's appendage without being obstructed by the generally cylindrical body of the shank 20.

Lugs 26 are pivotally connected to the appendage cover 40 by pivot pins or fasteners 32. Lugs 26 have fastener openings 24 for receiving fasteners 32. Likewise, appendage cover 40 has fastener openings 44 for fasteners 32. Fasteners 32 (such as a nut and bolt, rivets, etc.) pivotally join the bottom end of the shank 20 to an upper end of the appendage cover 40. Alternatively, the appendage cover 40 may be articulated to the shank 20 by a flexible piece of material forming a flexible hinge attaching the appendage cover 40 to the shank 20.

The appendage cover 40 may resemble a hoof in shape. In such case, the appendage cover 40 is generally a tapered cylinder, having one side of the cylindrical wall shorter than a diametrically opposing side of the wall. Vent openings 42 are defined in the appendage cover 40 to permit air to pass through to the animal's appendage.

The shield 10 is designed to guard an injured limb against damage, whether from external sources or from the animal itself. The shield 10 is placed over a bandaged area and thus prevents the animal from tampering with the bandage or a sutured area. The shield 10 is made of a sturdy plastic and can be made in a variety of sizes to accommodate any sized limb on any size animal.

Though the animal wound shield 10 is shown having one shank 20 attached to the appendage cover 40, the shield 10 may include more than one shank piece, or an upper and lower shank portion, which would be designed to lengthen the coverage of the shield 10 further up on the animal's limb. When using multiple shanks 20, the bottom end of the topmost shank may be articulated to the adjacent lower shank 20 using lugs 26, or the topmost shank 20 may be a separate piece, unconnected to the adjacent lower shank 20.

When the multiple shank embodiment is designed to articulate the two shank sections, the multiple shanks 20 are aligned so that the lugs 26 of the topmost shank 20 can be pivotally attached to the top end of the adjacent and subsequent shank 20. This connection method accommodates for the joint 50 between the femur and the tibia/fibula when used on the hind leg, and between the humerus and radius/ulna I fused on the arms.

In use, a user selects an appropriate size shield 10 for a particular injured animal. The shank 20 is slid over the bandaged limb and either taped to the limb using adhesive fastener 34, or fastened to the bandages on the limb by hook material 30, depending on what type of fastener 30, 34 is present or desired. The appendage cover 40, being pre-assembled to the shank 20, is arranged to cover the animal's appendage and allow the appendage cover 40 to pivot with the movement of the appendage.

It is to be understood that the present invention is not limited to the embodiments described above, but encompasses any and all embodiments within the scope of the following claims.

I claim:

1. An animal wound shield, comprising:
   a substantially rigid shank having a top end and a bottom end, the shank having a circumferentially continious, generally cylindrical side wall;
   a substantially rigid appendage cover having a circumferentially continuous top end and bottom end, the appendage cover having a generally tapered surface wherein one side is shorter than a diametrically opposing side, pivotally connected to a pair of unitary lugs extending from the bottom end of the shank; and
   means for fastening the shank to an animal's wounded limb and being located at the the top end of the shank, whereby the shank is slid over the animal's wounded limb with the appendage cover covering the animal's appendage and secured in place by said fastening means.

2. The animal wound shield according to claim 1 further comprising at least one pivot pin pivotally connecting the shank to the appendage cover.

3. The animal wound shield according to claim 1 further comprising at least one fastener pivotally connecting the bottom end of the shank to the top end of the appendage cover.

4. The animal wound shield according to claim 3, wherein the fastener comprises nuts and mating bolt.

5. The animal wound shield according to claim 3, said shank comprises opposing lugs extending from the bottom end of the shank, said at least one fastener comprising a pair of fasteners pivotally connecting the lugs of the shank to the top end of the appendage cover.

6. The animal wound shield according to claim 1, wherein said shank has a plurality of vent openings defined therein for air circulation.

7. The animal wound shield according to claim 1, wherein said appendage cover has a plurality of vent openings defined therein for air circulation.

8. The animal wound shield according to claim 1, further comprising additional means for fastening the outer surface of the top end of said shank to an animal's wounded limb.

9. The animal wound shield according to claim 8, wherein the additional fastening means comprises adhesive tape disposed about an outer surface of the top end of the shank.

10. The animal wound shield according to claim 1, wherein the means for fastening the inner surface of the shank comprises a patch of hook material lining the inner surface of the top end of the shank, the hook material being adapted for mating with a bandage applied to the wounded limb.

11. The animal wound shield according to claim 1, wherein the shank and the appendage cover are made of plastic.

12. The animal wound shield according to claim 1, wherein the appendage cover is generally a tapered cylinder having one side of the cylinder shorter than a diametrically opposing side of the cylinder and the bottom end is a closed end.

* * * * *